United States Patent [19]

Härtel et al.

[11] Patent Number: 5,245,870
[45] Date of Patent: Sep. 21, 1993

[54] APPARATUS FOR MEASURING THE FRACTION OF LIQUID FUEL IN A FUEL TANK

[75] Inventors: Günter Härtel, Neuss; Karl-Heinrich Lösing, Alpen; Armin Schürfeld, Meerbusch; Johann Blasczyk, Neuss; Harald Kerkmann, Düsseldorf, all of Fed. Rep. of Germany

[73] Assignee: Pierburg GmbH, Neuss, Fed. Rep. of Germany

[21] Appl. No.: 846,002

[22] Filed: Mar. 4, 1992

[30] Foreign Application Priority Data

Mar. 11, 1991 [DE] Fed. Rep. of Germany ....... 4107786

[51] Int. Cl.⁵ ............................................. G01F 17/00
[52] U.S. Cl. ..................................................... 73/149
[58] Field of Search ........................ 73/149, 49.7, 49.4, 73/49.2, 290 B, 291, 292

[56] References Cited

U.S. PATENT DOCUMENTS

| 4,535,627 | 8/1985 | Prost et al. | 73/149 |
| 4,770,033 | 9/1988 | Nicolai | 73/149 |
| 4,956,996 | 9/1990 | Morris | 73/149 |

FOREIGN PATENT DOCUMENTS

| 0453708 | 10/1991 | European Pat. Off. | 73/290 R |
| 0453709 | 10/1991 | European Pat. Off. | |
| 558118 | 12/1930 | Fed. Rep. of Germany | |
| 800431 | 11/1950 | Fed. Rep. of Germany | 73/290 B |

*Primary Examiner*—Robert Raevis
*Attorney, Agent, or Firm*—Ladas & Parry

[57] ABSTRACT

Apparatus for measuring the quantity of fuel in a fuel tank of a vehicle wherein a chamber 41 is disconnected from tank 1 and connected to a fuel pump 4 after the measurement of the fuel quantity in the tank is conducted, the tank 1 being connected to the atmosphere, so that membrane 26 is displaced upwards to a defined position against the action of spring 27 by the fuel which flows into chamber 41 under pressure. The fuel in chamber 41 is then delivered into tank 1 for another measurement, the chamber 41 then being disconnected from fuel pump 4 and connected to tank 1 which is closed to the atmosphere.

19 Claims, 2 Drawing Sheets form of a diaphragm is detected by a displacement sensor 31 in the manner of a differential transformer whose signal also acts on electronic control unit 22 through lines 23.

APPARATUS FOR MEASURING THE FRACTION OF LIQUID FUEL IN A FUEL TANK

FIELD OF THE INVENTION

The invention relates to apparatus for measuring the fraction of liquid fuel in a fuel tank.

BACKGROUND AND PRIOR ART

DE-PS 697,341 discloses a device based on the principle of determining the fraction of liquid fuel in a fuel tank from a piston displacement and the pressure change in the gas-filled tank space which results from this displacement. In this device, the piston is brought to a defined position by manual operation against the action of a spring, from which it is displaced by the spring force during measurement.

A similar device is disclosed in DE C2 29 53 903, in which the piston is displaced from a defined position by an air motor which operates at a pressure above or below atmospheric pressure. This device includes pressure sensors and displacement sensors, whose output signals may also be introduced, as the case may be, into an electronic control device for further processing.

Devices with manual displacement of the piston are out-of-date, and the displacement of the piston by means of an air motor takes up a large space, and can only be connected to the gas-filled tank space. Hence, such devices are not currently in use.

SUMMARY OF THE INVENTION

An object of the invention is to provide apparatus for measuring the fraction of liquid fuel in a fuel tank which operates without manual operation, has a small structural space requirement, and may be connected as desired to the fuel tank.

The apparatus, according to the invention, comprises a cylinder which is divided into first and second chambers by a membrane, the first chamber being adapted for connection to the fuel tank and to a fuel pump by valve means, the second chamber being at atmospheric pressure and containing a spring acting on the membrane. Displacement of the membrane is measured by a displacement sensor and pressure of the gas in a gas space in the fuel tank is measured by a pressure sensor. The first chamber is pressurized by the fuel from the fuel pump to displace the membrane to a readiness position as detected by the displacement sensor whereafter the first chamber is disconnected from the fuel pump by the valve means. The valve means then connects the first chamber to the fuel tank and the membrane will undergo displacement as a function of the pressure and volume of the gas in the gas space in the fuel tank. By measuring the displacement of the membrane and the absolute pressure of the gas in the gas space, the volume of the gas space can be determined from the general equation of state of an ideal gas and hence the volume of the fuel in the gas tank can be determined. After the determination of the fuel volume has been completed, the first chamber is again connected to the fuel pump and brought to its readiness position.

DETAILED DESCRIPTION OF A PREFERRED EMBODIMENT

Figure 1:
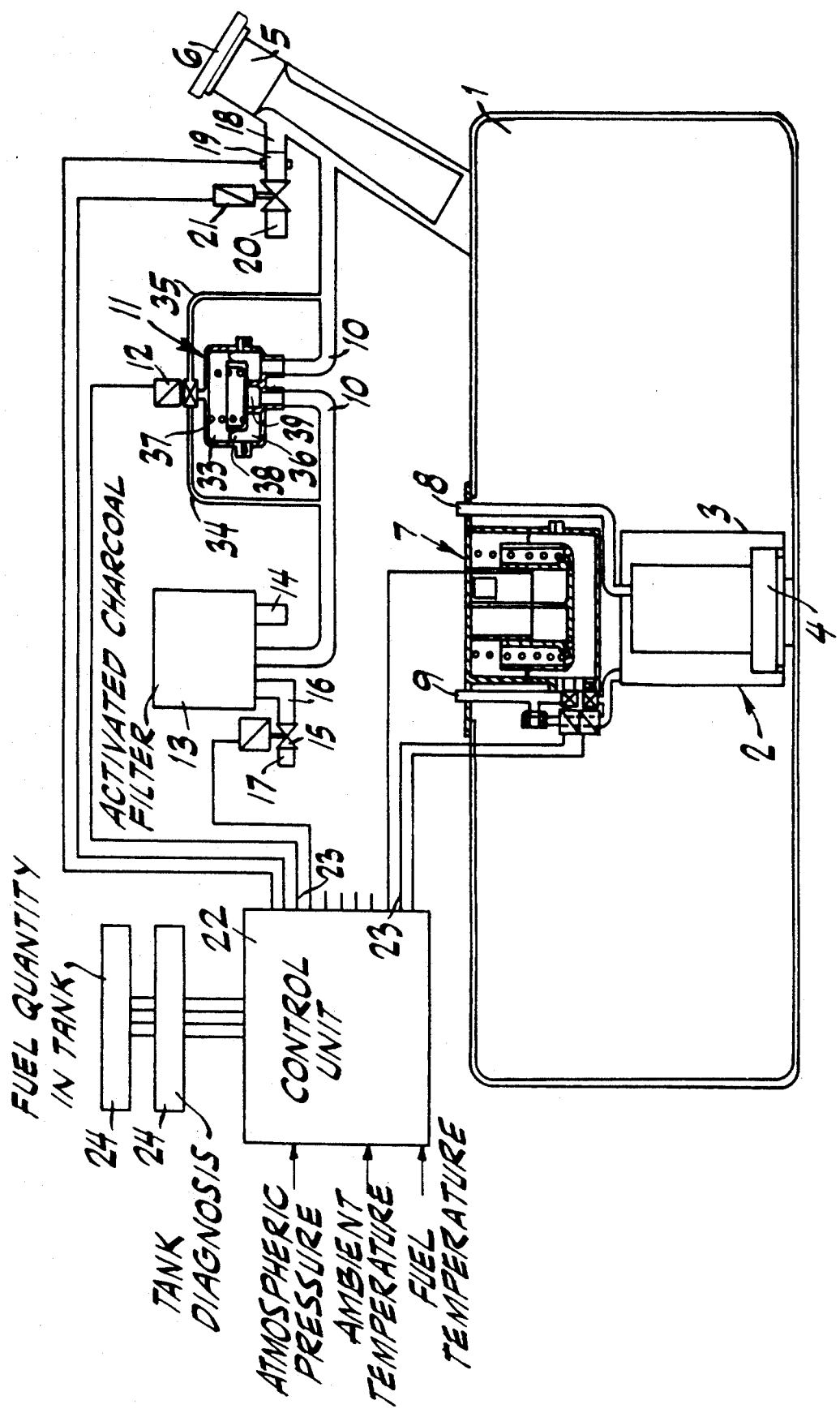
FIG. 1 is a schematic illustration of a device of the invention connected to the fuel tank of a motor vehicle.

FIG. 1 shows a fuel tank 1 with a fuel-delivery unit 2, consisting of a conventional anti-splash pot 3 and a fuel delivery pump 4. As is conventional, the fuel in the tank is pumped by fuel pump 4 to a fuel distribution means (not shown), such as a fuel injection system or carburetor for supply of fuel to an internal combustion engine of a vehicle. Fuel tank 1 has a tank filling tube 5 with a tank closure cap 6 as well as a cylinder 7 mounted on the upper wall of the tank 1. Cylinder 7 and fuel-delivery unit 2 are formed as a single structural unit. Cylinder 7 is shown on enlarged scale in FIG. 2. Fuel tank 1 is equipped with conduits 8, 9 respectively for fuel supply to the fuel distribution means and for fuel return from the fuel distribution means to tank 1. Tank 1 is also provided with a tank vent conduit 10. The vent conduit 10 is connected to the atmosphere through a pressure relief valve 11 controlled by a 2/3-way valve 12, whose function will be described later, and through an activated-charcoal tank 13 having a permanent connection to the atmosphere via an outlet connection 14. In order to regenerate the activated-charcoal tank 13, a timing valve 15 selectively connects the tank 13 to a suction pump (not shown) via a connection duct 16 and a line 17 as a function of the operating conditions of the internal combustion engine.

A pressure sensor 19 is connected in duct 18 to measure on one side of the sensor, the internal pressure in fuel tank 1, and on its other side atmospheric pressure through a duct 20. The application of the atmospheric pressure to the sensor 19 can be controlled by a shut-off valve 21 in duct 20. Thus, the reference pressure of the pressure sensor 19 (atmospheric pressure at the beginning of the measurement) can be stored. Errors in measurement values due to changes in atmospheric pressure, i.e. based on elevation changes during the measurement, are avoided in this way, and the stored volume of air acting on sensor 19 is sufficiently great in order to eliminate disturbing influences, which may be caused by the shut-off process, etc. Input signals are supplied to and processed in an electronic control unit 22 by means of signal lines 23, and output signals are produced by unit 22. The results of a calculation of fuel quantity in the tank and tank-tightness, as will be described later, can be shown on a display 24 and/or be further processed as will be explained later.

Figure 2:
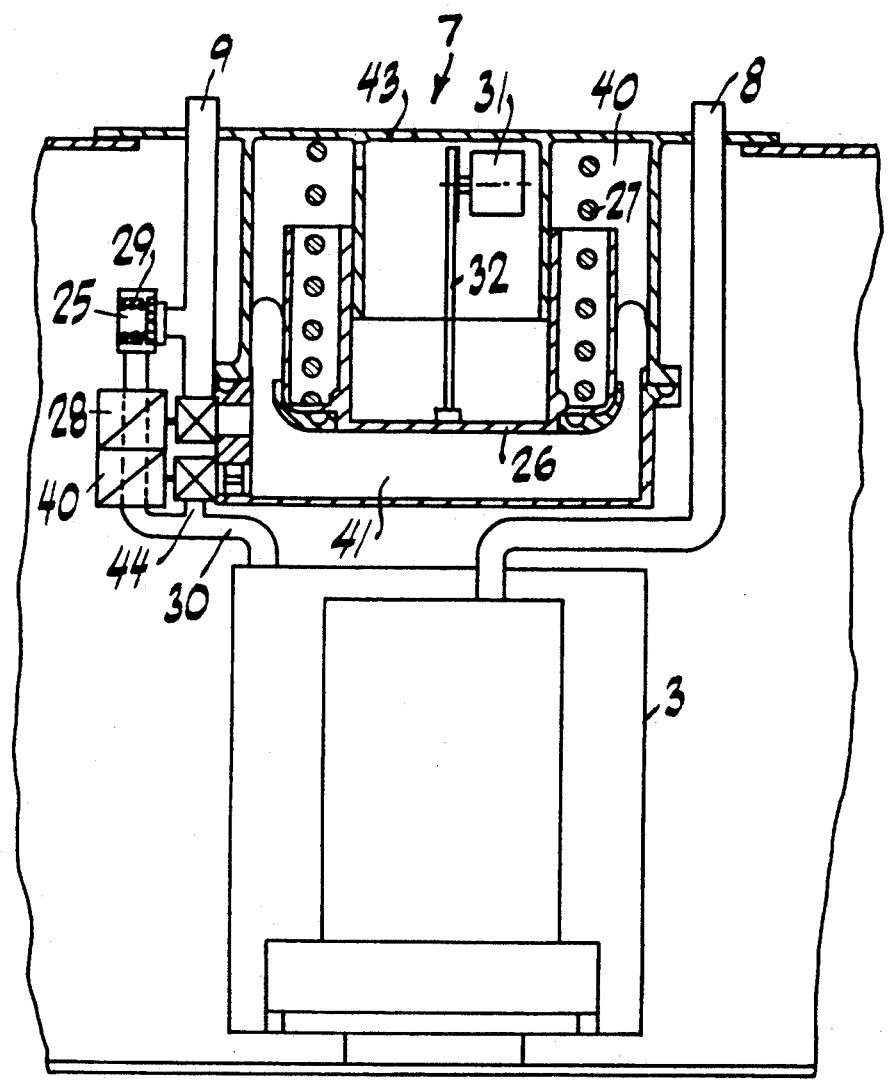
FIG. 2 shows on enlarged scale, a detail of FIG. 1.

FIG. 2 shows cylinder 7, in which the pressure in the fuel return conduit 9 as developed by pump 4 is retained by means of a differential pressure valve 25 and is utilized to prestress a membrane 26 against the force of a pressure spring 27. For this purpose, a 2/2-way relay valve 28 opens and a 2/2-way relay valve 40 is closed. Valve 28 controls the connection of return line 9 to a chamber 41 in cylinder 7 and valve 40 controls the connection of chamber 41 to a duct 30 connected to anti-splash pot 3. The force of a pressure spring 29 in differential pressure valve 25 is established such that the opening pressure of differential pressure valve 25 exceeds the pressure for prestressing membrane 26. Upon reaching a stop position of membrane 26, the pressure increases in fuel return line 9 until the opening pressure of differential pressure valve 25 is reached and the latter opens. Then, the fuel flows back to the tank 1 through a duct 30 to the splash pot 3. Membrane 26 is in a readiness or measurement-ready state for measurement of fuel quantity in the tank. The membrane position in the readiness state is detected by electronic control unit 22 by a position sensor 31 which, for example, is coupled to membrane 26 by a mechanical connection 32.

Shut-off valve 21 (FIG. 1) is opened so that the inside pressure of the tank may be measured as a differential pressure with respect to atmospheric pressure. The atmospheric pressure, the ambient temperature and, as the case may be, the fuel temperature are detected by sensors of the engine control system (not shown), and these measurements are transmitted by the latter to the control unit 2 and processed therein.

The 2/3-way valve 12 (FIG. 1) is in a state in this phase of the measurement cycle so that chamber 33 of the pressure relief valve 11 is at the prevailing atmospheric pressure in control pressure line 34 connected to that part of vent conduit 10 in which atmospheric pressure approximately prevails.

At the beginning of the measurement of the fuel quantity in the tank, the 2/3 way valve 12 is reversed, whereby chamber 33 is connected to the part of the vent conduit 10 in which the internal pressure of the tank prevails, via a control pressure line 35. In this way, the same pressure exists in chamber 33 as in chamber 36. A membrane 38 in valve 11 is pressed against a valve seat 39 by the force of a pressure spring 37, and the valve seat is kept closed during measurement. Hence, the tank 1 is now closed to the atmosphere.

Shut-off valve 21 is closed and thus the reference pressure of pressure sensor 19 (atmospheric pressure at the beginning of measurement) is stored. Errors in measurement values due to changes in atmospheric pressure, e.g. based on changes in elevation during measurement are therefore avoided.

The 2/2-way valve 28 (FIG. 2) is closed and the 2/2-way valve 40 is opened. In this way, the pressure decreases in a chamber 41 of cylinder 7. Since chamber 42 on the opposite side of membrane 26 is connected to the atmosphere via a ventilation borehole 43, the fuel stored in chamber 41 is displaced through 2/2-way valve 40, a connection 44 and duct 30 into anti-splash pot 3 of fuel delivery unit 2 until a pre-selected increase in the internal pressure of the tank is recorded by pressure sensor 19 (FIG. 1). In order to avoid dynamic effects, the time of the displacement can be extended to the necessary extent by the configuration of connection 44 and/or ventilation borehole 43 as throttling means. After reaching the pre-selected change in pressure, 2/2-way valve 40 is also closed and the travel of membrane 26 is measured by displacement sensor 31 while the final value of the change in pressure is measured by pressure sensor 19. Depending on the magnitude of the gas volume in the tank, the absolute pressure prevailing in the tank as well as the tank temperature or a value representing the latter (which is derived among others from the fuel temperature determined by the engine control system) a specific relationship between the change of volume and pressure is determined according to the general equation of state for an ideal gas ($pV = MRT$). The content of liquid fuel in the tank may be determined by simple calculation from the calculation of the gas volume enclosed in the tank by subtracting the gas volume from the known total volume of the fuel tank. The measurement and calculation of the content of fuel in the tank is then concluded. The result is indicated on display 24 and/or referred for other calculations, such as the travel distance for the vehicle remaining for the determined fuel content in the tank.

If the final position for measurement of fuel content in the tank is retained for a time period to be selected in advance, then any leakage of the fuel tank as well as the extent of such leakage can be determined from the change in the internal tank pressure, taking into consideration the temperature in the fuel tank and the gas volume enclosed in the fuel tank. If the leakage exceeds a permissible limiting value, this may also be indicated on the display and/or processed in another way, e.g. a diagnosis may be made upon re-ignition after a fuel stop, of whether the tank closure cover 6 is properly screwed on again and thus HC emissions from tank filling connection 5 are avoided.

After running the tank tightness test, valves 12, 21, 28 and 40 are again connected in the initially described positions, whereby chamber 41 is again filled with fuel and measurement readiness is achieved.

Alternatively, chamber 41 may be connected either with the delivery pump 4 or the tank by means of 2/3-way valve instead of relay valves 40 and 28. In the measurement-ready position of membrane 26, the fuel delivered in excess from conduit 9 then flows into tank 1 via differential pressure valve 25. This alternative is not suitable, however, for the tank tightness diagnosis.

In principle, chamber 41 may also be connected to fuel inlet conduit 8 or may be arranged outside the fuel tank in fuel inlet conduit 8 or the return conduit 9.

The following operating program can be established advantageously for determining fuel content in the tank in combination with control unit 22:

1. Establish measurement readiness by the value in sensor 31;
2. Establish internal tank pressure with respect to atmosphere in sensor 19;
3. Operate relay valve 21 close duct operate pressure relief valve 12 to close and atmospheric pressure line 34;
4. Open relay valve 40 to connect chamber 41 to the tank 1;
5. Allow displacement of the membrane 26 and the value in displacement sensor 31 to reach positions approximately 5% from the maximum possible displacement of membrane 46;
6. Set measurement time to zero and the values of displacement sensor 31 and pressure-sensor 19 for measurement start;
7. Measure changes in the values of sensor 31 and pressure sensor 19 as the membrane 26 is further displaced;
8. Reach the end of the change in the values of displacement sensor 31 and pressure sensor 19 or a preselected amount of change in the values of the displacement sensor and pressure sensor, which changes in values are above the starting values at time zero;
9. Close relay valve 40 to close chamber 41 to the tank;
10. Establish measurement time and values of displacement sensor 31 and pressure sensor 19;
11. Calculate in unit 22 actual content of fuel in the tank based on the pressure and displacement values relative to the actual atmospheric pressure and taking into account the tank temperature;
12. Emit an output signal of fuel content in the tank on the display or for further processing;
13. Reopen relay valves 21, 12 to open the relay valve 28 for connecting chamber 41 to the delivery pump 4.
14. Establish measurement readiness by the value of the sensor 31 (as for 1).

As has already been indicated, the measurement process can be maintained over a further time span, and the change in internal tank pressure, which is established, as the case may be, per unit of time, is evaluated as the measurement for calculating when the fuel tank will become empty.

However, if the device of the invention should be utilized only for diagnosis of tank tightness, it is provided that the membrane displacement is produced for the case of chamber 41 opened to the tank up to a preselected amount of change in the signal of the displacement sensor 31 or pressure sensor 19, which change exceeds the starting values, and then chamber 41 is closed to the tank and the membrane position is maintained for a further time period, and the change in internal tank pressure which is established per unit of time, as the case may be, is evaluated as a measurement for the empty state of the fuel tank, which is produced by liquid/gas fuel leakage from the tank and connection lines.

Over and above this, it is advantageously provided that the measurement for the empty state of the tank is reduced by the fraction which corresponds to the fuel consumption of the internal combustion engine calculated in control unit 22, or also that the measurement process is conducted totally or only after the output signal is present for indicating the fraction of liquid fuel in the tank when the internal combustion engine is turned off. Of course, an operating program for detection of tank tightness may also be established in control unit 22, whereby a permissible value for the pressure gradient may be stored in control unit 22, from which an error signal will be emitted if this value is exceeded.

With the device of the invention for measuring the fraction of liquid fuel in the fuel tank, a solution can be realized with small structural space requirements, with which an arbitrary arrangement of cylinder 7 or of chamber 41 is made possible directly on the tank above or below the fuel level, whereby it is perceived as advantageous to combine cylinder 7 with anti-splash pot 3 to form a single structural unit. In addition to the embodiment shown, in which chamber 41 is filled by the fuel quantity delivered in excess, it may also be provided that a pump provided only for this purpose fills the chamber 41 or the fuel-delivery pump 4 delivers fuel thereto in parallel with the fuel distribution means or in series in front of the fuel distribution means. It is understood, of course, that the activated-charcoal tank 13 may also be omitted.

The device makes possible a checking of fuel tank tightness within the scope of an on-board diagnosis.

Although the invention has been described in relation to a specific embodiment thereof, it will become apparent to those skilled in the art that numerous modifications and variations can be made within the scope and spirit of the invention as defined in the attached claims.

What is claimed is:

1. Apparatus for measuring the quantity of fuel in a fuel tank for an internal combustion engine of a vehicle, said apparatus comprising a cylinder, a membrane in said cylinder dividing the cylinder into first and second chambers, means for connecting the first chamber to a fuel tank, means connecting the second chamber to the atmosphere, a spring acting on said membrane to apply a force thereto, means for measuring displacement of said membrane, from an initial defined position, to a displaced position produced by the spring force applied to the membrane when the first chamber is connected to the fuel tank, means for measuring gas pressure in a gas space in said tank, the quantity of fuel in the fuel tank being determined from the pressure and displacement values measured, means for pressurizing said first chamber with fuel pumped from the fuel tank by a fuel pump, to displace said membrane against the spring force to said defined position, valve means for disconnecting the fuel pump from the first chamber so that the fuel contained in said first chamber flows to said tank during measurement when the membrane is displaced by the spring force, and means for venting the fuel tank to atmosphere during engine operation and for closing communication of the fuel tank with the atmosphere during measurement.

2. Apparatus as claimed in claim 1, wherein said valve means comprises a first valve for opening and closing communication between said first chamber and said tank, and a second valve for opening and closing communication between said first chamber and said fuel pump.

3. Apparatus as claimed in claim 2, comprising a differential pressure valve connected upstream of said second valve to bypass said valve means and deliver fuel from said fuel pump directly to said fuel tank after said membrane is in said initial defined position.

4. Apparatus as claimed in claim 3, comprising an anti-splash pot in said fuel tank through which fuel from said first chamber and fuel flowing through said differential pressure valve passes to said tank.

5. Apparatus as claimed in claim 1, wherein said means for measuring gas pressure in the gas space in the tank comprises a pressure sensor connected, on one side thereof, to the gas space in the tank and, on an opposite side thereof, to the atmosphere, and a shut off valve between the pressure sensor and the atmosphere for storing air at atmospheric pressure on said opposite side of the pressure sensor.

6. Apparatus as claimed in claim 1, wherein said means for venting the fuel tank to the atmosphere comprises a vent conduit connecting said gas space in the tank to the atmosphere and a pressure relief valve in said vent conduit.

7. Apparatus as claimed in claim 6, comprising an activated-charcoal tank connected in said vent conduit between said pressure relief valve and the atmosphere.

8. Apparatus as claimed in claim 1, comprising control means connected to said valve means, said means for measuring displacement of said membrane and said means for measuring gas pressure in said gas space in the tank to evaluate the fraction of liquid fuel in the fuel tank based on the determination of the gas space in the fuel tank from the general equation of state for an ideal gas.

9. Apparatus as claimed in claim 8, wherein said control means carries out the following operations:
   1. establishes readiness for measurement by a signal from the means which measures displacement of the membrane;
   2. measures internal tank pressure with respect to the atmosphere based on a signal from said means which measures gas pressure in the gas space in the tank;
   3. operates the valve means to connect the first chamber to the tank whereby the membrane undergoes displacement due to the spring force;
   4. when the membrane reaches a position approximately within 5% of its maximum displacement, representing a final position, the control means sets measurement time at zero and receives pressure signals from the means for measuring gas pressures and displacement signals from the means for measuring displacement of the membrane;

5. establishes that gas pressure and membrane displacement values undergo change from the values received at time zero;
6. uses as measurement values the values of gas pressure and membrane displacement which depart from the values at time zero;
7. calculates actual content of the fuel in the tank from said general equation of state based on the values from operation 6;
8. produces an output signal of fuel content;
9. operates the valve means to provide communication between the first chamber and the fuel pump;
10. verifies return of the apparatus for readiness for operation as in operation 1.

10. Apparatus as claimed in claim 9, wherein said means for measuring gas pressure in the gas space in the tank comprises a pressure sensor connected, on one side thereof, to the gas space and, on an opposite side thereof, to the atmosphere, and a shut off valve between the pressure sensor and the atmosphere for storing air at atmospheric pressure on said opposite side of the pressure sensor, said means for venting the fuel tank to the atmosphere comprising a vent conduit connecting said gas space in the tank to the atmosphere and a pressure relief valve in said vent conduit.

11. Apparatus as claimed in claim 10, wherein after producing the output signal and before returning the apparatus to readiness state, said control means continues to receive pressure and displacement signals over a period of time for determining leakage of gas or fuel from the tank while the engine is off and fuel consumption while the engine is running.

12. Apparatus as claimed in claim 11, wherein said pressure and displacement signals are received by said control means to evaluate fuel consumption and fuel or gas leakage while said membrane is subject to the spring force and said first chamber is disconnected from said fuel pump.

13. Apparatus as claimed in claim 11, wherein said control means receives a signal representing fuel consumption and produces a value to indicate when the tank will be empty based on the amount of fuel calculated in the tank and the fuel consumption.

14. Apparatus as claimed in claim 13, wherein said control means when producing the value indicative of when the fuel tank will be empty receives signals for absolute pressure in the tank and temperature of the tank and utilizes these signals to determine the latter said value.

15. Apparatus as claimed in claim 9, further comprising means for supplying values of current atmospheric pressure and tank temperature to said control means.

16. Apparatus as claimed in claim 15, wherein said tank temperature value is determined by a sensor measuring fuel temperature.

17. Apparatus as claimed in claim 1, wherein said means for measuring displacement of said membrane serves for indication of the fraction of liquid fuel in the tank when the engine is off.

18. Apparatus as claimed in claim 1, wherein said control means stores a predetermined value representing an empty state of the tank and includes means for producing a signal when the determined fuel quantity in the tank reaches said predetermined value.

19. Apparatus as claimed in claim 1, wherein said valve means comprises a 2/3-way valve connected to selectively connect said first chamber with said fuel tank or said fuel pump.

* * * * *